Dec. 13, 1960  F. H. SNYDER  2,964,518
AMINO-HYDRO-PYROLYSIS OF WOODY MATERIALS
Filed June 28, 1956
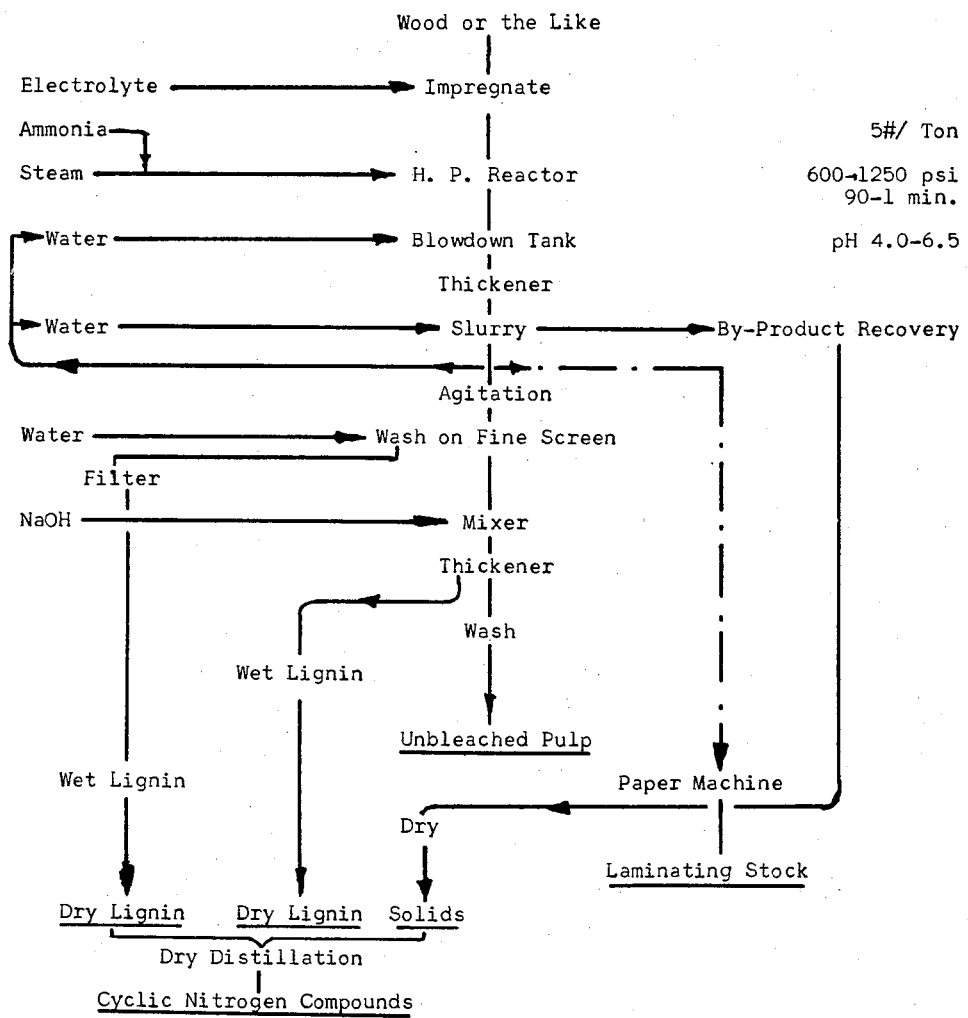
INVENTOR
Francis H. Snyder
BY
ATTORNEYS

2,964,518

AMINO-HYDRO-PYROLYSIS OF WOODY MATERIALS

Francis H. Snyder, Newtown, Conn., assignor to Francis H. Snyder and Associates, Incorporated, New Milford, Conn., a corporation of Connecticut Filed June 28, 1956, Ser. No. 594,400

13 Claims. (Cl. 260—124)

This invention relates to the amino-hydro-pyrolysis of woody materials.

In this process, woody material is subjected to the action of ammonia and steam at pressures in the range of 600 to 1250 p.s.i. at the temperatures prevailing at such pressures or about 250 to 300° C. for relatively short periods of time to produce a very large number of products.

The woody raw material may be any substance of a ligno-cellulosic character and will usually be selected on the basis of availability. Scrap or waste from lumber mills is readily available in many areas of the world and is usually to be preferred from the point of view of cleanness and uniformity. Somewhat improved process control is to be had by operation upon a single species of wood for successive runs, hence the process will normally be operated in such manner even though the process as a whole is applicable as stated to all woody materials.

For example, a very satisfactory initial material can be obtained from oak flooring ends. These range from 1 to 5 inches long and are available in quantity. They may first be reduced to chips about ⅜ to ¾ inch by ⅛ to ¼ inch thick. These are soaked in water until complete penetration is obtained. About 10 to 30 percent water is adequate as it is preferred to leave the coarse capillaries open, free of water. In order to induce entry of the water into the cell structure, it may be advantageous to subject the chips to mechanical treatment such as rolling or squeezing or to pressure, say up to 100 p.s.i. Excess water may be drained off and the water extractives disposed of as convenient. Green wood may be used instead, with less need for soaking.

The drawing shows a flow sheet of the preferred embodiment of the process.

I prefer to add to the water used for soaking the chips, a strong (at least .01 ionized) electrolyte of about N/10 strength, since this materially reduces the reaction time at high pressure. The electrolyte may be dilute caustic soda, in which case, some of the water-extractable portions of the wood, such as tannins and acetic acid, will be removed. It may be $H_2SO_4$, in which case a slight increase in the amount of ammonia will be required. However, unless acid or alkali pretreatment is desired to modify the products, sodium sulfate is cheap and equally effective. Except for the obvious effects—such as the loss of extractives when caustic soaking is used—the electrolyte acts catalytically without noticably affecting the products of the reaction.

The moist chips are loaded into a pressure vessel and dry ammonia is admitted. Initially, it is best to mix the ammonia with air to promote thorough absorption to the heart of the chips. No pressure is required at this stage; the chips take up the ammonia readily. The amount of ammonia used may range from 100 to 175 pounds of $NH_3$ per ton of D.W.S. or even higher. The ammonia not only facilitates a cleavage between the cellulose and lignin fractions of the wood; it also enters into chemical combination with the lignin to a material degree and with the cellulose to a lesser degree.

After the ammonia has been taken up by the moist wood, dry steam is admitted at high pressure and for extended periods of time up to 90 minutes. Obviously, the longest reaction time is used with the lowest pressure and vice versa. Typically, at 1000 p.s.i., the time is about 70 to 90 seconds. After this treatment, the reaction mass is explosively discharged into a receiving tank containing about five to ten times its weight of water, substantially halting the progress of the reaction.

The liquid is first drained and then pressed out of the mass, following which small additional amounts of soluble substances may be recovered by washing with limited amounts of water. The lignin is so substantially depolymerized and modified as to be measurably water soluble at neutrality.

The lignin will also be found to have taken up a substantial amount of nitrogen. Whereas lignin derived from wood in the ordinary process is precipitated from dilute alkaline solution by the addition of acid, appreciable amounts of the modified lignin of this process are soluble in 2 percent hydrochlorid acid, indicative of the nitrogen that has entered the lignin structure. Dry distillation of the lignin material, either alone or with the evaporated residue of the liquid from the high pressure reaction, produces a large yield of cyclic nitrogen compounds.

A large amount, up to 80 percent or more, of the modified lignin can be mechanically removed from the fiber by mechanical agitation and the remainder dissolved away by dilute (2 to 4 percent) cold alkali or by acetone. Such lignin may be separately employed, either as a source of organic nitrogen compounds or as an extender for phenolic resin.

The fiber or cellulose fraction of the wood, with lesser amounts of ammonia, is not extensively degraded. Small amounts are modified to appear as glucosamines and pentosamines.

The fiber, after removal of the lignin and of a few percent of coarse fiber bundles, may be employed in any conventional way that wood pulps are. If wood pulp is to be recovered as such, it is well to separate it from the lignin within 48 hours after the high pressure treatment, as the highly depolymerized lignin tends to diffuse into the fiber, adversely affecting bleachability. The lignin and fiber mass, without separation, after washing, may be used as an ingredient in fiber-reinforced plastics or laminates.

More drastic treatment involving higher pressures and/or longer holding periods, especially at the higher nitrogen utilization levels, produce a black granular product wherein the cellulosic structure has been radically altered by the nitrogen. High yields of nitrogen ring compounds are obtained by dry distillation. The granular material also is valuable as a fertilizer material yielding its nitrogen content.

It will be obvious that my new process is subject to wide variation to yield many products valuable both in themselves and for the further products to be made from them. Since the initial raw materials are either low in cost or normally wasted, the process has great economic value.

What I claim is:

1. The process of modifying the properties of ligno-cellulose material, including saturating the material with an aqueous strong electrolyte having a normality in excess of 0.1 until at least 10 pounds of water are taken up by 100 pounds air-dry material, further saturating the material with ammonia until at least 5.0 pounds of ammonia are taken up by 100 pounds air-dry material, subjecting the treated material to steam pressure of 600 to 1,250 p.s.i. for ninety minutes to 1 minute, draining liquid from the reacted mass and further separating said mass into a fibrous portion and ligneous portion containing organically bound nitrogen in the lignin structure.

2. The process of claim 1 wherein the separation of the reacted mass is carried out by strong mechanical agitation.

3. The process of claim 4 wherein the fibrous fraction is further delignified by washing with dilute alkali at normal temperatures.

4. The process of claim 1 wherein the ligneous fraction is subjected to dry distillation.

5. The process of claim 1 wherein the liquid recovered is destructively distilled.

6. The process of claim 1 wherein the electrolyte is at least .01 ionized at 0.1 normal.

7. The process of claim 1 wherein the electrolyte is an acid.

8. The process of claim 7 wherein the acid is sulfuric acid.

9. The process of claim 1 wherein the electrolyte is an alkali.

10. The process of claim 9 wherein the alkali is sodium hydroxide.

11. The process of claim 1 wherein the electrolyte is a substantially neutral salt, formed of a strong acid and a strong base.

12. The process of claim 11 wherein the salt is sodium sulfate.

13. The process of modifying the properties of ligno-cellulose material, including saturating the material with an aqueous strong electrolyte having a normality in excess of 0.1 until at least 10 pounds of water are taken up by 100 pounds air-dry material, further saturating the material with ammonia until at least 5.0 pounds of ammonia are taken up by 100 pounds air-dry material, subjecting the treated material to steam pressure of 600 to 1,250 p.s.i. until the pH of the liquid drained from the reacted mass falls between 4.0 and 6.5, draining liquid from the reacted mass and further separating the reacted mass into a fibrous portion and a ligneous portion containing organically bound nitrogen in the lignin structure.

References Cited in the file of this patent

UNITED STATES PATENTS

| | | |
|---|---|---|
| 1,469,960 | Richter et al. | Oct. 9, 1923 |
| 2,228,349 | Feldman | Jan. 14, 1941 |
| 2,292,389 | Meiler | Aug. 11, 1942 |
| 2,334,620 | Goodell | Nov. 16, 1943 |